(12) United States Patent
Jurzak et al.

(10) Patent No.: US 9,961,611 B2
(45) Date of Patent: May 1, 2018

(54) DYNAMIC GATEWAY SELECTION IN A WIRELESS COMMUNICATIONS SYSTEM

(71) Applicant: MOTOROLA SOLUTIONS, INC, Chicago, IL (US)

(72) Inventors: Pawel Jurzak, Cracow (PL); Waldemar K. Dworakowski, Cracow (PL); Tomasz Mariusz Warzecha, Katowice (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days. days.

(21) Appl. No.: 15/122,667

(22) PCT Filed: Apr. 29, 2014

(86) PCT No.: PCT/PL2014/000043
§ 371 (c)(1),
(2) Date: Aug. 31, 2016

(87) PCT Pub. No.: WO2015/167348
PCT Pub. Date: Nov. 5, 2015

(65) Prior Publication Data
US 2017/0078943 A1    Mar. 16, 2017

(51) Int. Cl.
*H04W 16/26* (2009.01)
*H04W 40/22* (2009.01)
(Continued)

(52) U.S. Cl.
CPC .......... *H04W 40/22* (2013.01); *H04B 17/318* (2015.01); *H04L 5/006* (2013.01);
(Continued)

(58) Field of Classification Search
CPC .... H04W 16/26; H04W 17/318; H04W 88/16
See application file for complete search history.

(56) References Cited

U.S. PATENT DOCUMENTS

| 7,142,857 | B1 | 11/2006 | Calabrese et al. |
| 7,593,376 | B2 | 9/2009 | D'Amico et al. |

(Continued)

FOREIGN PATENT DOCUMENTS

| GB | 2409129 A | 6/2005 |
| WO | 2004028086 A2 | 4/2004 |

(Continued)

OTHER PUBLICATIONS

The International Search Report and the Written Opinion, International Application No. PCT/PL2014/000043, filed: Apr. 29, 2014, all pages.

(Continued)

*Primary Examiner* — Asghar Bilgrami

(57) ABSTRACT

A method and apparatus for selecting a gateway to extend the communication range of a wireless communication device in a radio communication system are provided. A first communication device monitors transmissions from a second wireless communication device. The first device requests that the second device act as a gateway, receives an acknowledgement, and then can initiate a connection via the second device to the radio communication system. The connection uses a first receiver and a transmitter of the first device. The first device uses a second receiver to monitor the second device, and other wireless communication devices of the system, thereby dynamically maintaining a list of at least a primary gateway and a secondary gateway that are available for relaying a connection from the first device.

15 Claims, 10 Drawing Sheets

(51) Int. Cl.

| | | |
|---|---|---|
| *H04W 76/00* | (2018.01) | |
| *H04W 76/02* | (2009.01) | |
| *H04B 17/318* | (2015.01) | |
| *H04L 5/00* | (2006.01) | |
| *H04W 36/30* | (2009.01) | |
| *H04W 36/32* | (2009.01) | |
| *H04W 48/00* | (2009.01) | |
| *H04W 68/00* | (2009.01) | |
| *H04W 88/06* | (2009.01) | |
| *H04W 92/18* | (2009.01) | |
| *H04W 88/04* | (2009.01) | |
| *H04W 88/16* | (2009.01) | |

(52) U.S. Cl.
CPC ........... *H04W 16/26* (2013.01); *H04W 36/30* (2013.01); *H04W 36/32* (2013.01); *H04W 48/17* (2013.01); *H04W 68/005* (2013.01); *H04W 76/005* (2013.01); *H04W 76/023* (2013.01); *H04W 76/025* (2013.01); *H04W 76/14* (2018.02); *H04W 76/15* (2018.02); *H04W 76/45* (2018.02); *H04W 88/04* (2013.01); *H04W 88/06* (2013.01); *H04W 88/16* (2013.01); *H04W 92/18* (2013.01)

(56) References Cited

U.S. PATENT DOCUMENTS

| | | |
|---|---|---|
| 8,989,167 B2 | 3/2015 | Namm et al. |
| 9,344,532 B2 | 5/2016 | Corretjer et al. |
| 2004/0028086 A1 | 2/2004 | Ghiasi et al. |
| 2007/0121521 A1 | 5/2007 | D'Amico et al. |
| 2009/0156210 A1 | 6/2009 | Ponce De Leon et al. |
| 2012/0135677 A1 | 5/2012 | Hsu et al. |
| 2012/0157146 A1 | 6/2012 | Theisen et al. |
| 2012/0238208 A1* | 9/2012 | Bienas ............... H04W 8/24 455/41.2 |
| 2013/0156134 A1 | 6/2013 | Galan et al. |
| 2014/0092771 A1* | 4/2014 | Siomina ............ H04W 24/08 370/252 |
| 2014/0148178 A1* | 5/2014 | Wippich ........... H04W 76/026 455/450 |

FOREIGN PATENT DOCUMENTS

| | | | |
|---|---|---|---|
| WO | 2005039116 A1 | 4/2005 | |
| WO | 2008050110 A1 | 5/2008 | |
| WO | WO 2008050110 A1 * | 5/2008 | ............ H04W 92/18 |
| WO | 2012027054 A1 | 3/2012 | |
| WO | 2014058824 A1 | 4/2014 | |
| WO | WO 2014058824 A1 * | 4/2014 | ............ H04L 69/14 |

OTHER PUBLICATIONS

Park, Bok-Nyong et al.: "QoS-Aware Adaptive Internet Gateway Selection in Ad Hoc Wireless Internet Access Networks", Broadband Communications, Networks and Systems, 2006, BROADNETS 2006, 3rd International conference on, Oct. 1-5, 2006, DOI: 10.1109/BROADNETS.2006.4374361, all pages.

Javaid, Usman et al.: "Hybrid Wireless Networks—Towards an Efficient Gateway Discovery Scheme", Global Information Infrastructure Symposium, 2007, GIIS 2007, First International, Jul. 2-6, 2007, DOI: 10.1109/GIIS.2007.4404166, all pages.

* cited by examiner

DYNAMIC GATEWAY SELECTION IN A WIRELESS COMMUNICATIONS SYSTEM

This application is a National Stage filing under 35 USC § 371 of co-pending Patent Cooperation Treaty international application having Ser. No. PCT/PL2014/00043 (the 'PCT international application') filed on Apr. 29, 2014. This application claims priority to the PCT international application, the entire contents of which are incorporated herein by reference.

BACKGROUND OF THE INVENTION

Wireless radio communications systems may comprise many mobile or portable subscriber units. Each subscriber unit will require a certain grade of service, in order to support the communication requirements of a user of the subscriber unit. Here the 'grade of service' may be one or more of coverage, capacity, voice/data quality, or another defined parameter. Particular design constraints and usage scenarios arise with two way radio communication systems, such as TETRA and ASTRO systems, or with systems such as LTE.

'Mission Critical' radio communications systems include public safety systems used by police, firefighters, medical and other emergency or security services. 'Mission Critical' radio communications systems are often pre-planned to provide sufficient grade of service in a customer-defined area. Effective pre-planning provides a considerable 'grace' (margin) in system resources, to mitigate un-planned events. Despite such planning, there are real-life situations where the pre-planned system may fail to perform, which may well occur at a critical time. System coverage may, for example, become an issue inside buildings, particularly on top floors, in underground car parks or in shopping malls or in similar situations. In another example, there may be areas such as forests where the infrastructure of base stations supporting the subscriber units is thinly spread or non-existent, due to the low probability of subscriber units placing calls from such locales.

In one usage scenario, the user of a portable subscriber unit may be a police officer who moves out of range of the base stations of a wireless communication system when chasing a suspect. The officer may not even be aware that she/he is leaving the system coverage. In such situations, there is insufficient time and/or equipment to allow the officer's colleagues to set up a repeater or a gateway to extend coverage. In such cases, it may be of value to the officer to be able to start an emergency call, or to send a status or text message to an individual portable radio or dispatcher, for instance, to inform the officer's colleagues about the location of a suspect. In some such scenarios, it would also be beneficial to keep full connectivity between the officer's subscriber unit and the reminder of a call group or dispatcher. Such connectivity would permit the officer to be notified about the locations of other officers, or to receive commands.

In known systems, users have devised various "work arounds" to lack of coverage. Some users employ "talkaround". A "talkaround" channel is a channel that operates in simplex mode without benefit of a repeater. Other users switch between digital mode and analogue mode to attempt to extend coverage. However, these modes deliver differing levels of quality, and both modes may not support data. Some firefighters, as users of cellular radio systems, also carry separate cellular phones. Their aim is to hope to be able to make a call on a cellular phone when their dispatch wireless communications device cannot receive an adequate signal due to system outages and/or "dead spots". However, group calls may be taking place on the dispatch wireless communications device, and may not be available on the cellular phone.

Accordingly, there is a need for a dynamic gateway selection method and system in a wireless communication system.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
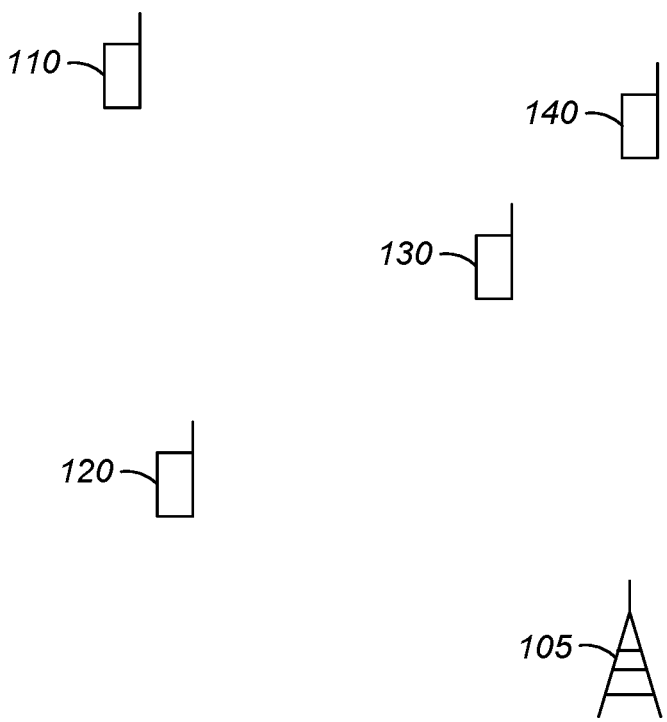
FIG. 1 is a schematic perspective view of a radio communication system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

A method of dynamically selecting a gateway to extend the communication range of a wireless communication device is provided. The wireless communication device comprises at least two receivers and a transmitter for communicating with a base station and/or with other wireless communication devices of a radio communication system. A first wireless communication device monitors, by a second receiver of the wireless communication device, transmissions from at least a second wireless communication device of the radio communication system. The first wireless communication device identifies that the second wireless communication device can act as a gateway for relaying communications between the first wireless communication device and the radio communication system. The first wireless communication device transmits a request to the second wireless communication device, to request that the second wireless communication device act as a gateway for the first wireless communication device, and receives an acknowledgement from the second wireless communication device that the second wireless communication device can act as a gateway for the first wireless communication device. The first wireless communication device initiates a connection between the first wireless communication device and the radio communication system via the second wireless communication device, wherein the connection uses a first receiver and a transmitter of the first wireless communication device.

The first wireless communication device may designate the second wireless communication device as a primary gateway, and designate a third wireless communication device as a secondary gateway. To do this, the first wireless communication device monitors transmissions from the second wireless communication device and the third wireless communication device, and identifies that the second and third wireless communication devices can act as a gateway for relaying communications between the first wireless communication device and the radio communication system. The first wireless communication device transmits requests to both the second and third wireless communication devices, to request that each device act as a gateway for a connection, and receives an acknowledgement that each device can act as a gateway for the first wireless communication device. The first wireless communication device ranks the second wireless communication device as a primary gateway and the third wireless communication device as a secondary gateway, on the basis of signals received from the second and third communication devices.

The method may therefore extend the original coverage of the radio communication system by dynamically selecting wireless communication devices that can operate as a gateway to provide ad-hoc coverage. The first wireless communication device, when out of range, can communicate and stay connected to the larger network. When the first wireless communication device can still communicate with the second and third wireless communication devices in direct mode, for example, it can automatically select a primary and secondary gateway and establishes a link with the primary gateway where coverage, for example in a building, is an issue. The secondary gateway is used when the primary cannot operate as a gateway any longer, for example when the primary gateway moves to different location or starts a call of its own. Then the secondary gateway becomes the primary choice, and the first wireless communication device may seek to identify another wireless communication device to act as a 'reserve' secondary gateway. The method may enable a given grade of service (coverage, capacity and/or voice/data quality), with a lower degree of pre-planning of infrastructure than with known radio communication systems. For example, a fixed TETRA repeater may not need to be installed, or a Digital Vehicle Repeater System (DVRS) may not need to be provided, in order to achieve a given grade of service to users of wireless communication devices operating in a zone where designers of the radio network communication system has not anticipated a need for that grade of service. The method of the invention may take advantage of capabilities of full duplex wireless communication devices, such as dual watch radio subscriber units, when a wireless communication device is out of network coverage, but is within coverage of other wireless communication devices that are themselves within network coverage.

FIG. 1 is a schematic perspective view of a radio communication system 100. Base station 105 may support first wireless communication device 110, second wireless communication device 120, third wireless communication device 130, and fourth wireless communication device 140, which may be full-duplex portable or mobile subscriber units. Radio communication system 100 and the various wireless communication devices that base station 105 supports may, for example, function in accordance with TETRA, P25, or Broadband protocols.

Although FIG. 1 is not drawn to scale, the discussion of FIG. 1 henceforth assumes that first wireless communication device 110 is located further away from base station 105 than any of second wireless communication device 120, third wireless communication device 130, and fourth wireless communication device 140. In a typical scenario, base station 105 is fixed but each of first wireless communication device 110, second wireless communication device 120, third wireless communication device 130, and fourth wireless communication device 140 would be a mobile or portable radio communication device, so may either be moving or may move at another time point.

Figure 2:
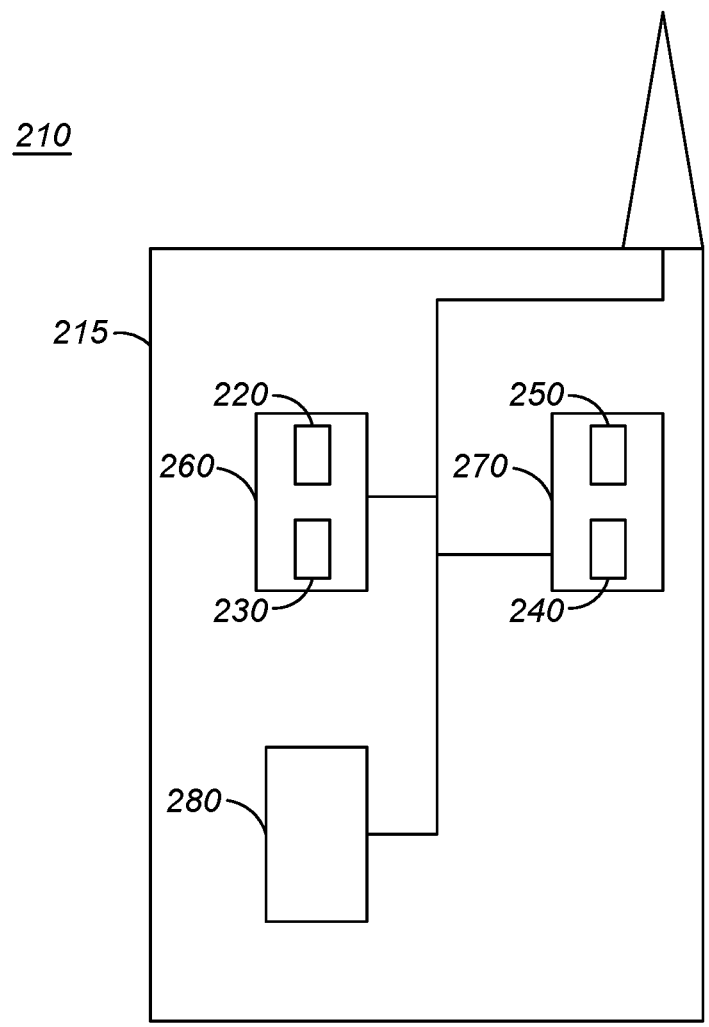
FIG. 2 is a block diagram of a wireless communication device in accordance with some embodiments.

FIG. 2 a block diagram of a wireless communication device 210 in accordance with some embodiments. Wireless communication device 210 corresponds to first wireless communication device 110 of FIG. 1, and is a full duplex communication device. In addition, each of second wireless communication device 120, third wireless communication device 130, and fourth wireless communication device 140 may have the configuration and functionality described below for wireless communication device 210.

Wireless communication device 210 comprises a housing 215. Within housing 215 are a first transmitter 220, first receiver 230 and second receiver 240. Wireless communication device 210 may also comprise a second transmitter 250. When wireless communication device 210 is a 'dual watch' wireless communication device 210, the first transmitter 220 and first receiver 230 may form part of a first transceiver 260. Second receiver 240 and second transmitter 250 may form part of a second transceiver 270. Memory 280 stores program code for implementing one or more of the methods described herein.

In the illustrative example of FIG. 1, first wireless communication device 110 may dynamically select a gateway to extend its communication range. First wireless communication device 110 may dynamically select any of second wireless communication device 120, third wireless communication device 130, and fourth wireless communication device 140 to function as the gateway, provided that they are full duplex wireless communication devices that are not currently involved in their own connection.

Considering wireless communication device 210 of FIG. 2, first transmitter 220 and first receiver 230 communicate directly with base stations of the radio communication system, such as base station 105, when wireless communication device 210 is within range of the base stations. Second receiver 240 monitors transmissions from other wireless communication devices of the radio communication system. Those other wireless communication devices include any or all of second wireless communication device 120, third wireless communication device 130, and fourth wireless communication device 140. Even when wireless communication device 210 is actively involved in a duplex call via base station 105, second receiver 240 monitors transmissions from other wireless communication devices. In an alternative scenario, first transmitter 220 and first receiver 230 of wireless communication device 210 may communicate directly with another wireless communication device, in a direct mode of operation. During such a direct mode call, second receiver 240 can monitor signals from other wireless communication devices, or from base stations, so that the wireless communication device is constantly aware of the strength of signals available to it, in its present location. Returning to FIG. 1, an example of a direct mode call would be a call between first wireless communication device 110 and fourth wireless communication device 140, without that call passing through base station 105 or any other part of the infrastructure of radio communication system 100. When wireless communication device 210 has selected another wireless communication device to act as a gateway for a connection, the first transmitter 220 and first receiver 230 of wireless communication device 210 will communicate with the wireless communication device that has been selected to act as a gateway.

Figure 3:
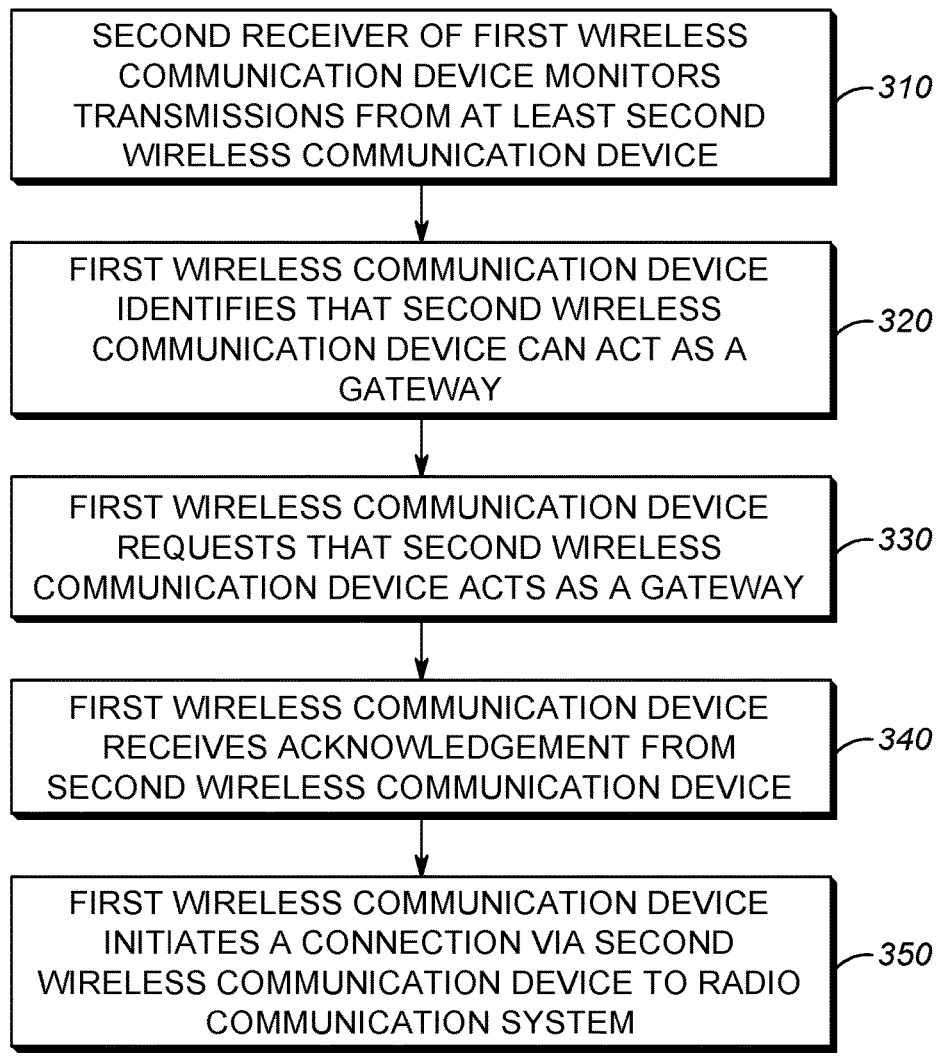
FIG. 3 is a flowchart of a method of operation in accordance with some embodiments.

FIG. 3 is a flowchart of a method 300 of setting up a gateway mode in radio communication system 100. In operation, in step 310, first wireless communication device 110 of FIG. 1 monitors, by its second receiver 240, transmissions from at least second wireless communication device 120. First wireless communication device 110, in step 320, identifies that the second wireless communication device can act as a gateway for relaying communications between first wireless communication device 110 and base station 105 of radio communication system 100. First wireless communication device 110 may contact other wireless communication devices on a talk-around channel, which all gateway-capable wireless communication devices monitor on their second receivers 240. All gateway-capable wireless communication devices monitor the talk-around channel when they are not themselves looking for a gateway. First wireless communication device 110 will then identify that second wireless communication device 120 can act as a gateway, when second wireless communication device 120 responds to contact from the first wireless communication on the talk around channel. All gateway-capable wireless communication devices monitor the talk-around channel when they are not themselves looking for a gateway.

In step 330, first wireless communication device 110 transmits a request to second wireless communication device 120, to request that second wireless communication device 120 acts as a gateway for first wireless communication device 120. Second wireless communication device 120 may receive the request from first wireless communication device 110 on its second receiver 240. In step 340, first wireless communication device 110 receives an acknowledgement from second wireless communication device 120 that second wireless communication device 120 can act as a gateway for first wireless communication device 110. Second wireless communication device 120 may, for example, only send the acknowledgment when it is currently able to receive a control channel or a voice channel from base station 105 of radio communication system 100.

In step 350, subsequently, first wireless communication device 110 initiates a connection to radio communication system 100 via second wireless communication device 120, wherein the connection uses first receiver 230 and first transmitter 220 of first wireless communication device 110. First wireless communication device 110 may initiate the connection, for example, by making a request that the second wireless communication device 120 now begin propagating signals. This second request differs from the request in step 330, which is a request that the second wireless communication device 120 indicate its availability to act as a gateway when a situation arises in which first wireless communication device 110 needs a gateway at some timepoint.

Second wireless communication device 120 then starts to propagate signals between first wireless communication device 110 and base station 105 of radio communication system 100. Second wireless communication device 120 thereby functions as a gateway, by providing the connection for first wireless communication device 110 via second wireless communication device 120. When functioning as a gateway, second wireless communication device 120 uses its second receiver 240 for receiving signals from the "out of range" first wireless communication device 110 that needs a gateway. When functioning as a gateway, second wireless communication device 120 uses its first receiver 230 for receiving signal from base station 105. Some dual watch radio subscriber units may only have a single transmitter, corresponding to first transmitter 220, and hence do not have the second transmitter 250 shown in FIG. 2. The single transmitter 220 can be used both for propagating signals from "out of range" first wireless communication device 110 to base station 105, and for propagating signals from base station 105 to first wireless communication device 110.

When operating in conventional mode, second wireless communication device 120 propagates signals from first wireless communication device 110 such that base station 105 processes the signals as if those signals had been received directly from first wireless communication device 110. When operating in trunked mode, second wireless communication device 120 first receives assignment of a channel, which it asks for on behalf of first wireless communication device 110, before propagating signals from first wireless communication device 110 to base station 105.

First wireless communication device 110 may initiate a connection to radio communication system 100 via second wireless communication device 120 when first wireless communication device 110 detects that it is moving out of coverage of radio communication system 100, for example based on location data from a GPS or other positioning subsystem. Alternatively or in addition, first wireless communication device 110 may initiate a connection to radio communication system 100 via second wireless communication device 120 when first wireless communication device 110 receives a signal from the radio communication system that is either below a threshold value, or is deteriorating at a rate that is greater than a threshold rate.

When first wireless communication device 110 is a dual watch subscriber unit having at least two transceivers, a first transceiver 260 comprises the first receiver 230 and the first transmitter 220. A second transceiver 270 comprises the second receiver 240 and the second transmitter 250. However, the method may be employed by a dual watch subscriber unit having two receivers, i.e. first receiver 230 and second receiver 240, and just one transmitter, i.e. first transmitter 220. Radio communication system 100 may be a dispatch radio communication system. Some or all of the wireless communication devices in the dispatch radio communication system may be used by public safety staff, such as firefighters, police or medical staff. The wireless communication devices may operate in trunked, conventional or direct mode, using first transceiver 260. Radio communication system 100 may be a 'mission critical system', not accessible to the general public.

The method of FIG. 3 does not have a significant impact on other wireless communication devices in the radio communication system. Any user whose wireless communication device serves as a temporary gateway can start a call, or move to a different location. If the user of the first wireless communication device moves, then the first wireless communication device can automatically change the gateway to provide appropriate coverage, without active intervention of the user of the first wireless communication.

Figure 4:
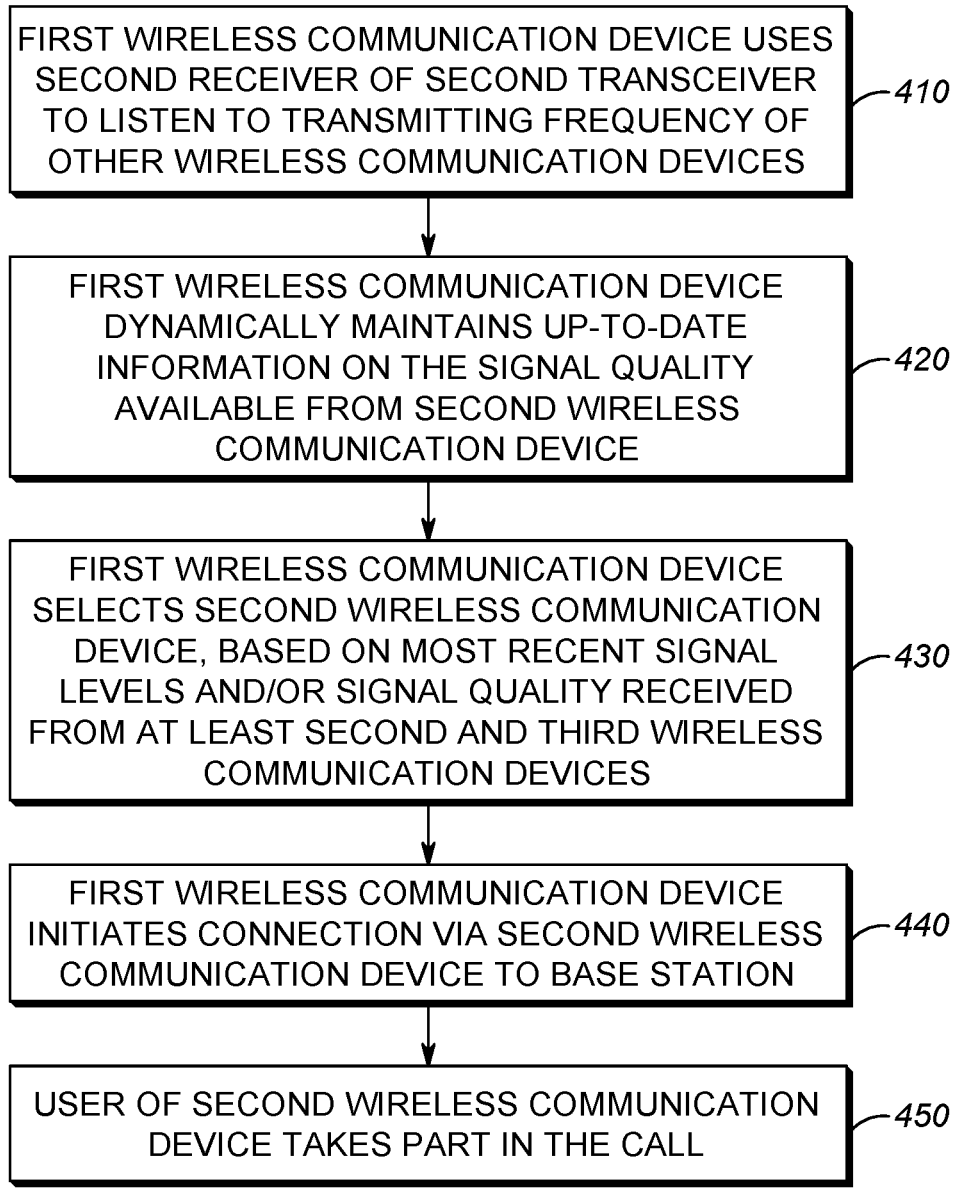
FIG. 4 is a flowchart of a method of selecting a wireless communication device to act as a gateway in accordance with some embodiments.

FIG. 4 is a flowchart of a method 400 of selecting a wireless communication device to act as a gateway. At step 410, first wireless communication device 110 may use second receiver 240 of second transceiver 270 to listen to a transmitting frequency of other wireless communication devices of the radio communication system 100. First wireless communication device 110 dynamically maintain up-to-date information on the signal quality available from at least second wireless communication device 120, see step 420. First wireless communication device 110 may dynamically maintains up-to-date information on the signal quality available from several wireless communication devices, in which case it can maintain an up to date ranking list of gateway candidates. Instead or in addition, first wireless communication device 110 may dynamically maintain up-to-date information on the location of at least second wireless communication device 120, when information is available on the location of second wireless communication device 120, and use location in ranking the list of gateway candidates.

First wireless communication device 110 may, at step 430, decide to select second wireless communication device 120 and transmit the request second wireless communication device 120, based on the most recent signal levels and/or signal quality parameters received by first wireless communication device 110 from at least second wireless communication device 120 and third wireless communication device 130. Instead or in addition, first wireless communication device 110 may select second wireless communication device 120, based on the most recent distance information available that is indicative of the separation between first wireless communication device 110 and second wireless communication device 120, and between first wireless communication device 110 and third wireless communication device 130.

First wireless communication device 110 may transmit the request to second wireless communication device 120, when first wireless communication device 110 is switched on in a location where a signal received from radio communication system 100 is below a threshold quality level.

When first wireless communication device 110 does not receive an acknowledgement from second wireless communication device 120 within a predetermined time period, first wireless communication device 110 may then transmit a request to third wireless communication device 130, to request that third wireless communication device 130 act as a gateway for first wireless communication device 110. When third wireless communication device 130 acknowledges the request, then first wireless communication device 110 knows that third wireless communication device 130, rather than second wireless communication device 120, is available to act as a gateway for first wireless communication device 110.

Optionally, following step 430 and before or after initiating a connection, first wireless communication device 110 may return to step 410. Although first wireless communication device 110 has selected a potential gateway or may have initiated a connection from the gateway, first wireless communication device 110 may continue to monitor signals from other wireless communication devices.

When step 430 does result in first wireless communication device 110 selecting second wireless communication device 120 and receiving an acknowledgement from second wireless communication device 120 within a predetermined time period, second wireless communication device 120 can initiate a connection between first wireless communication device 110 and base station 105 with second wireless communication device 120 acting as the gateway. See step 440.

First wireless communication device 110 may initiate the connection when first wireless communication device 110 detects either that it can no longer communicate directly with base station 105 of radio communication system 100, or that a received signal from base station 105 is below a preconfigured threshold. Alternatively, first wireless communication device 110 may transmit the request to second wireless communication device 120 and receive the acknowledgement from second wireless communication device 120, while first radio communication device 110 is still able to communicate directly with base station 105 of radio communication system 100. When, subsequently, first radio communication device 110 is unable to communicate directly with base station 105, first radio communication device 110 initiates the connection between first wireless communication device 110 and base station 105 of radio communication system 100 via second wireless communication device 120.

After first wireless communication device 110 initiates the connection to base station 105 of radio communication system 100 via second wireless communication device 120, a user of second wireless communication device 120 may listen in to, or take part in, the connection. See step 450. When the connection is a group call involving voice communication and data, then the user of second wireless communication device 120 may be able to listen to other wireless communication devices on (taking part in) the call, receive data transmitted by other wireless communication devices during the call, and speak to the users of the other wireless communication devices.

First wireless communication device 110 may initiate the connection between first wireless communication device 110 and radio communication system 100 via second wireless communication device 120 on a trunked channel, the trunked channel having been assigned to first wireless communication device 110 by the radio communication system in response to a request for a trunked channel from second wireless communication device 120. Thus second wireless communication device 120 may act to request a trunked channel on behalf of first wireless communication device 110 (e.g., on a control channel of the radio communication system 100), in response to the request from first wireless communication device 110 that second wireless communication device 20 act as a gateway.

In an embodiment, first wireless communication device 110 may monitor transmissions from at least second wireless communication device 120 and third wireless communication device 130 of radio communication system 100, and identify that both of the second 120 and third 130 wireless communication devices can act as a gateway for relaying communications between first wireless communication device 110 and radio communication system 105. First wireless communication device 110 then transmits requests to the second 120 and third 130 wireless communication devices, to request that each act as a gateway for the first wireless communication device. When first wireless communication device 110 receives an acknowledgement from both devices that they can act as a gateway, first wireless communication device 110 ranks second wireless communication device 120 and third wireless communication device 130 on the basis of signals received from them. First wireless communication device 110 may then designate second wireless communication device 120 as a 'primary' gateway, and designate third wireless communication device 130 as a 'secondary' gateway. Where more wireless communication devices send acknowledgements back to first wireless communication device 110, those other wireless communication devices may also be ranked.

Figure 5:
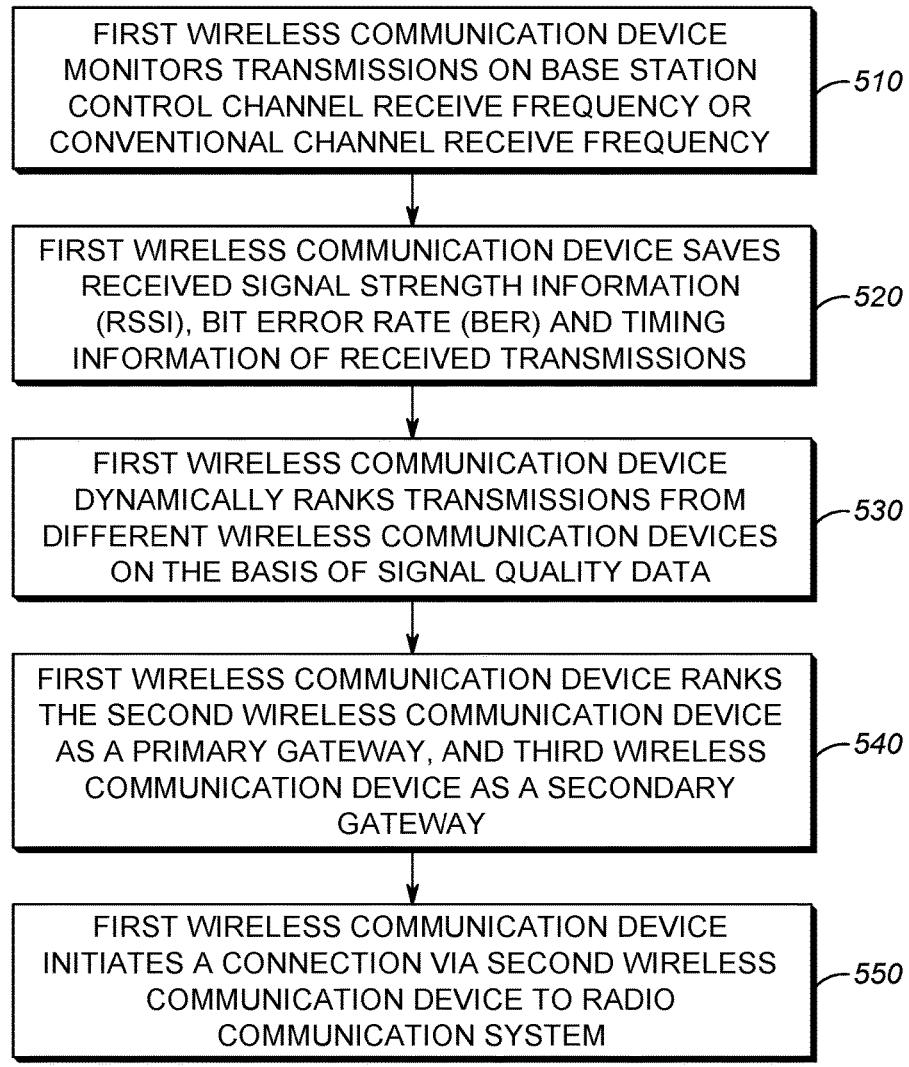
FIG. 5 is a flowchart of a method of ranking multiple wireless communication devices in accordance with some embodiments.

FIG. 5 is a flowchart of a method 500 of ranking multiple wireless communication devices that may each be able to act as a gateway. At step 510, when first wireless communication device 110 monitors transmissions from second wireless communication device 120 and third wireless communication device 130, second receiver 240 of first wireless communication device 110 may monitor the transmissions on a base station control channel receive frequency, when the radio communication system is a trunked system. Alternatively, second receiver 240 of first wireless communication device 110 may monitor the transmissions on a base station conventional channel receive frequency, when the radio communication system is a conventional system. In an optional step 520, first wireless communication device 110 may save received signal strength information (RSSI), bit error rate (BER) and timing information for transmissions received from second wireless communication device 120 and third wireless communication device 130. At step 520, first wireless communication device 110 may receive and store other information from many other wireless communication devices, which can be used in the ranking. That information may, for example, include various control signaling packets, status messages and direct or indirect indications of the locations of the other wireless communication devices.

After step 520, first wireless communication device 110 then has data available on the transmissions received within a predetermined time interval from second wireless communication device 120 and the third wireless communication device, and can create to create a dynamic ranking list of on the basis of, for example, the RSSI information. See step 530, where first wireless communication device 110 ranks dynamically transmissions from different wireless communication devices on the basis of signal quality data. The result may be a decision at step 540 that second wireless communication device 120 is a primary gateway choice, and third wireless communication device 130 is a secondary gateway. In this scenario, at least second wireless communication device 120, and third wireless communication device 130 are both in locations where they might, if available and consenting, serve as a gateway to relay communications between first wireless communication device 110 and radio communication system 100. In some embodiments, second wireless communication device 120 may be able to act as gateway to a different base station of radio communication system 100 than the base station to which third wireless communication device 130 can act as a gateway. At step 550, first wireless communication device 110 initiates a connection, when needed, via second wireless communication device 120 acting as a gateway to base station 105 of radio communication system 100.

After receiving an acknowledgement from second wireless communication device 120 that second wireless communication device 120 can act as a gateway for first wireless communication device 110, first radio communication device 110 may provide a notification to a user of first radio communication device 110 that a gateway is available for a connection between first radio communication device 110 and base station 105 or to another base station of radio communication system 100.

Figure 6:
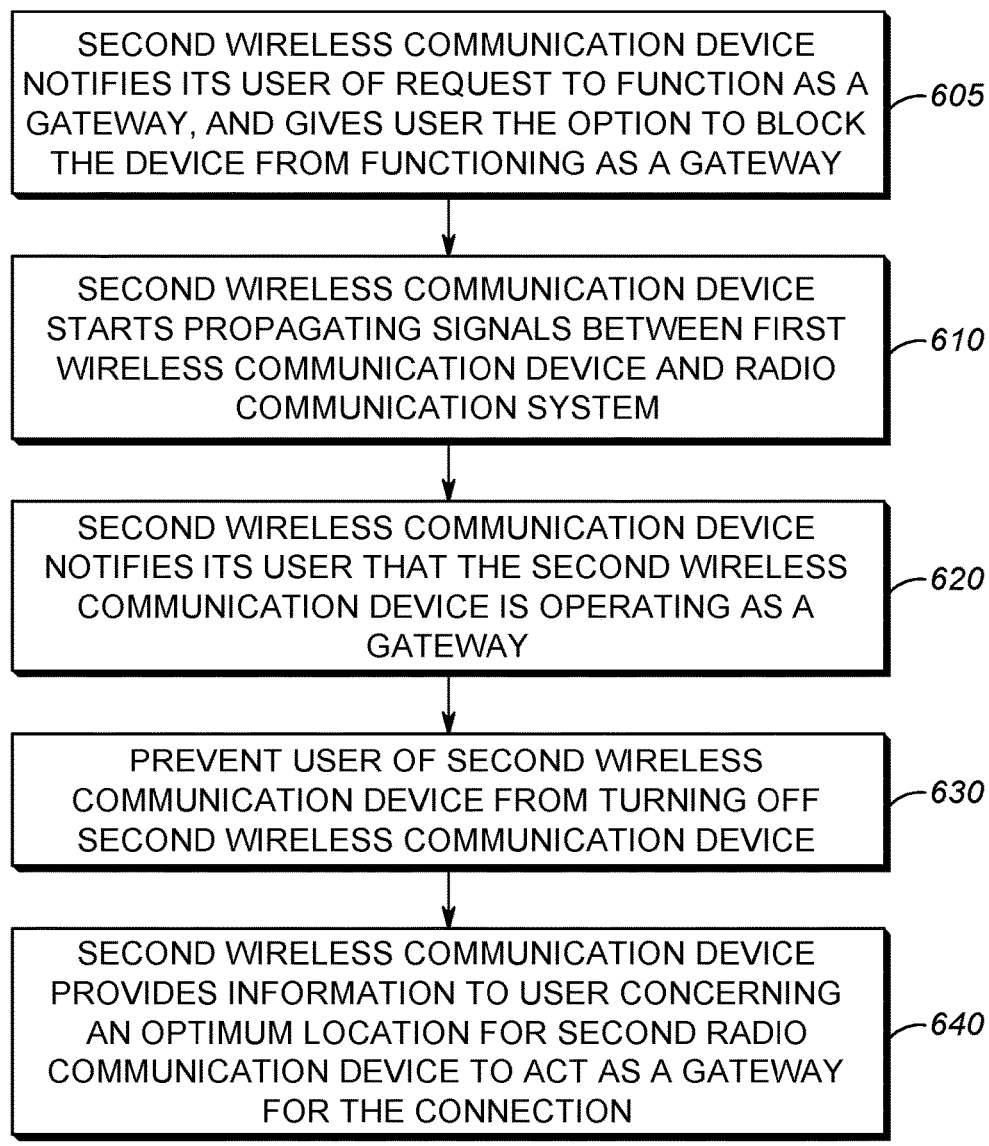
FIG. 6 is flowchart of a method of notifying a user of a gateway wireless communication device in accordance with some embodiments.

FIG. 6 is flowchart of a method of notifying a user of a gateway wireless communication device in accordance with some embodiments. At optional step 605, second wireless communication device 120 notifies the user of the second wireless communication device 120 about the request 330 from the first wireless communication device 110. Also at optional step 605, the user may be offered the option to block the second wireless communication device 120 from acting as a gateway. This blocking action may take the form of the user preventing the second wireless communication device 120 from sending the acknowledgement, see box 340 in FIG. 3. The user may choose to block the second wireless communication device 120 from acting as a gateway for one of a variety of reasons, for example because the user is about to use the second wireless communication device 120, or the user is the 'captain' of a public safety group.

At step 610, when first wireless communication device 110 initiates the connection between first wireless communication device 110 and base station 105 via second wireless communication device 120, second wireless communication device 120 starts propagating signals between first wireless communication device and base station 105 of radio communication system 100. At step 620, second radio communication device 120 may provide a notification to a user of second radio communication device 120 that second radio communication device 120 is acting as a gateway for the connection, thereby alerting the user of second radio communication device 120. In addition, in optional step 630, the user of second radio communication device 120 may then be unable to turn off the second radio communication device 120 as long as the connection continues. In addition, after initiating the connection and during the connection, at step 640 second radio communication device 120 may provide information to a user of second radio communication device 120 concerning an optimum location for second radio communication device 120 to act as a gateway for the connection. When users of first radio communication device 110 and second radio communication device 120 are members of the same team, such as two firefighters of the same unit, then the user of second radio communication device 120 may change location, to better support the connection.

Radio communication system 100 may be a mission critical public safety radio communication system. First wireless communication device 110 may request that second wireless communication device 120 initiate a connection for an emergency call between first wireless communication device 110 and the radio communication system, via second wireless communication device 120. In this case, second wireless communication device 120 will terminate an ongoing second connection between second wireless communication device 120 and at least one other wireless communication device, the second connection being of lower priority than the emergency call. Second wireless communication device 120 will then initiate the connection for the emergency call between first wireless communication device 110 and base station 105 of radio communication system 100, via second wireless communication device 120. Until the connection is complete or first wireless communication device 110 is out of range of second wireless communication device 120, second wireless communication device 120 then prevents a user of second wireless communication device 120 from initiating a new connection from second wireless communication device 120 to any other wireless communication device. Instead or in addition, second wireless communication device 120 may prevent a user of second wireless communication device 120 from turning second wireless communication device 120 off.

When a connection is operating via second wireless communication device 120, either first wireless communication device 110 or second wireless communication device 120 may want the connection to continue through another wireless communication device, i.e. to no longer to pass via second wireless communication device 120. First wireless communication device 110 may wish to use a different wireless communication device as a gateway, when it is moving out of range of second wireless communication device 120, or is receiving a significantly stronger signal from another wireless communication device that is also gateway-capable. Second wireless communication device 120 may wish that first wireless communication device 110 use a different wireless communication device as a gateway, when a user of second wireless communication device 120 wishes to start its own call, leave a talkgroup associated with the connection, or is intending to move, amongst other possibilities.

Figure 7:
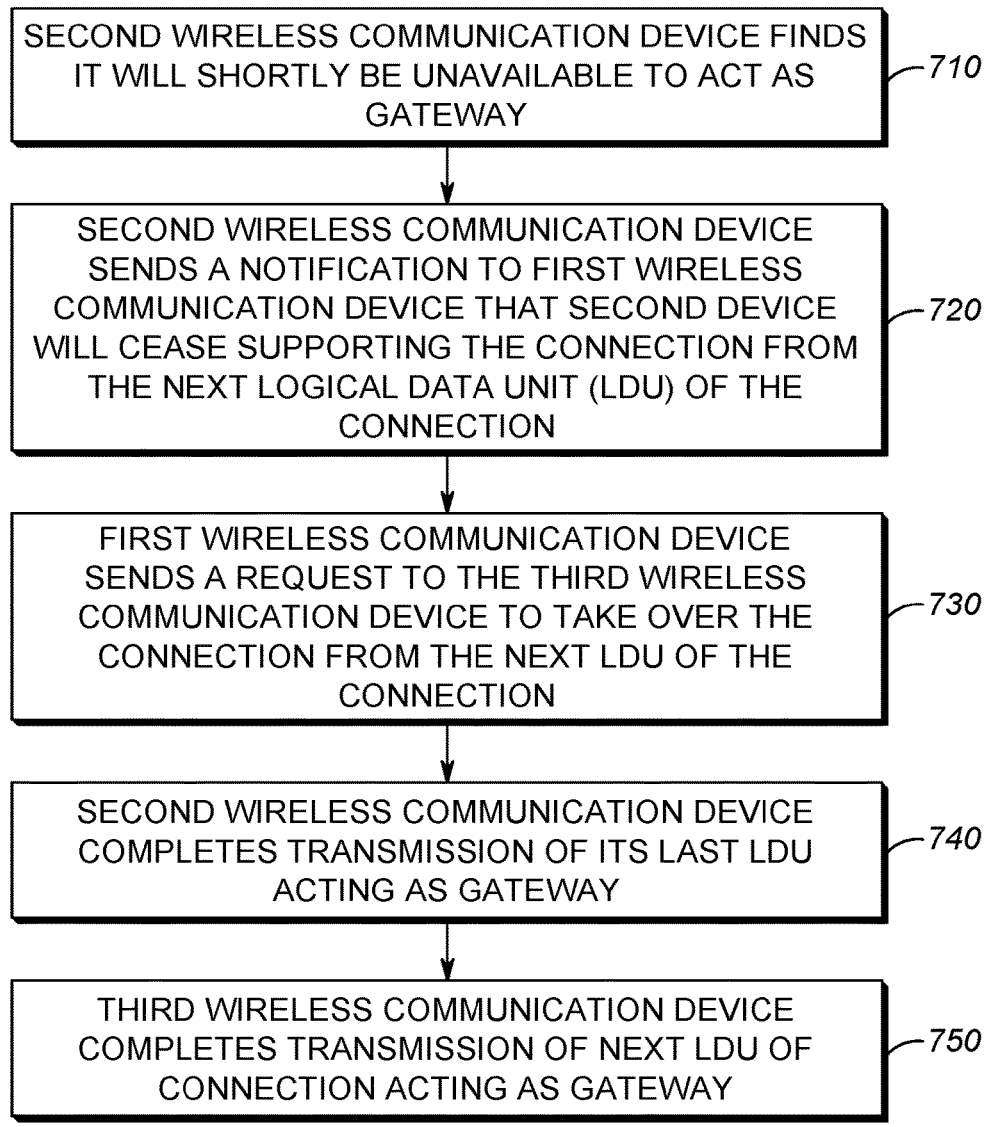
FIG. 7 is flowchart of a method of terminating operation as a gateway in accordance with some embodiments.

FIG. 7 is flowchart of a method of terminating operation as a gateway, for example by second wireless communication device 120. Initially, second wireless communication device 120 is supporting a connection between first wireless communication device 110 and base station 105, i.e. acting as a gateway. When a user of second wireless communication device 120 either initiates a second connection involving second radio communication device 120, moves out of range of first wireless communication device 110, moves out of range of the radio communication system 100, or switches off second radio communication device 120, then second wireless communication device 120 will no longer be available to support the connection, see step 710. Second wireless communication device 120 sends a notification to first wireless communication device 110 that second wireless communication device 120 will cease supporting the first connection between first wireless communication device 110 and the radio communication system, see step 720. The notification may be embedded in a current voice frame. If, instead, the notification is transmitted in place of one voice frame, the users are unlikely to notice the loss on speech or delay in data involved.

First wireless communication device 110 will then send a request to third wireless communication device 130 to take over the connection between first wireless communication device 110 and base station 105 of radio communication system 100. See step 730. The request to third wireless communication device 130 in step 730 may be embedded in a current voice frame. If, instead, the notification is transmitted in place of one voice frame, the users are unlikely to notice the loss of speech, or the delay in data that results.

Before second wireless communication device 120 ceases supporting the first connection between first wireless communication device 110 and the radio communication system, second wireless communication device 120 may complete transmission of a current Logical Data Unit (LDU) of the connection. The notification from second wireless communication device 120 may comprise a message that second wireless communication device 120 will cease supporting the first connection starting from a next Logical Data Unit (LDU) of the connection, see again step 720. In this case, the request from first wireless communication device 110 to third wireless communication device 130 may comprise a request that third wireless communication device 130 take over the connection from the next Logical Data Unit (LDU) of the connection. See again step 730.

The result, at step 740, is an orderly termination of support as a gateway by second wireless communication device 120. At step 750, there is an immediate start of transmission of the next LDU by third wireless communication device 130. There will therefore be no 'audio holes', i.e. gaps in the connection, perceived by users of the connection. When second wireless communication device 120 completes transmission of a current Logical Data Unit (LDU) of the connection, there will be a delay of no more than 180 ms to the start of a new connection for the user of second wireless communication device 120, on second wireless communication device 120.

Although FIG. 7 considers the situation when second wireless communication device 120 wants to terminate the connection, similar steps apply when first wireless communication device 110 wishes to move the connection and commence support of the connection via, for example, third wireless communication device 130. In this situation, at step 720, first wireless communication device 110 sends a request to second wireless communication device 120 that second wireless communication device 120 cease supporting the connection from the next Logical Data Unit (LDU) of the connection and stop propagating signals to base station 105. First wireless communication device 110 wishes to move the connection and commence support of the connection via third wireless communication device 130 for one of several reasons. One reason may be when first wireless communication device 110 believes that there may be 'audio holes' in a connection, or detects an interruption to propagation of the connection. First wireless communication device 110 may monitor, on second receiver 240, whether second wireless communication device 120 is propagating the call. First wireless communication device 110 is then able to switch gateway, when it detects any issue with propagating the call via second wireless communication device 120 to base station 105. Another reason is when first wireless communication device 110 is moving away from second wireless communication device 120.

In some embodiments, second wireless communication device 120 and third wireless communication device 130 may both be listening to first wireless communication device 110 on the same frequency. In this case, one message from first wireless communication device 110 may both request that second wireless communication device 120 cease supporting the connection at the end of the current LDU (analogous to step 720), and that third wireless communication device 130 take over the connection from the start of the next LDU (step 730).

The method explained in connection with FIG. 7 allows a properly synchronized handover of the role of gateway, when either first wireless communication device 110 or second wireless communication device 120 wants the connection to continue through another wireless communication device. Discontinuation of service by second wireless communication device 120 and commencement by third wireless communication device 130 occur in a synchronized manner, without audio holes becoming apparent to a user of the first wireless communication device 110.

The discussion of FIGS. 1 and 2 has focused on creating a connection for first wireless communication device 110 via another mobile communication device to base station 105, or to another base station of radio communication system 100. However, any of second wireless communication device 120, third wireless communication device 130, and/or fourth wireless communication device 140 or one of possibly many other wireless communication devices may act as the gateway between first wireless communication device 110 base station 105, or to another base station of radio communication system 100.

First wireless communication device 110 may periodically receive messages from second wireless communication device 120 and third wireless communication device 130, the messages indicating the continued availability of second wireless communication device 120 and third wireless communication device 130 to act as gateways. However, when first wireless communication device 110 has not yet initiated a connection, the rankings of second wireless communication device 120 and third wireless communication device 130 may change.

When no message is received from either second wireless communication device 120 or third wireless communication device 130 for a predetermined period, first wireless communication device 110 may transmit a request to fourth wireless communication device 140, to request that fourth wireless communication device 140 act as a gateway for first wireless communication device 110. First wireless communication device 110 receives an acknowledgement from fourth wireless communication device 140 that fourth wireless communication device 140 can act as a gateway for first wireless communication device 110. Thus first wireless communication device 110 can dynamically maintain a list of at least a primary gateway and a secondary gateway available to first wireless communication device 110 for relaying communications between first wireless communication device 110 and radio communication system 100.

First wireless communication device 110 may receive a message from second wireless communication device 120 and/or third wireless communication device 130, the message indicating that the second and/or third wireless communication device is no longer available to act as a gateway. First wireless communication device 110 may then remove the respective wireless communication device from its ranking, and transmit a request to a fourth wireless communication device, to request that fourth wireless communication device 140 act as a gateway for first wireless communication device 110. First wireless communication device 110 receives an acknowledgement from fourth wireless communication device 140 that fourth wireless communication device 140 can act as a gateway for first wireless communication device 110. First wireless communication device 110 can thereby dynamically maintain a list of at least a primary gateway and a secondary gateway available to first wireless communication device 110 for relaying communications between first wireless communication device 110 and the radio communication system.

First wireless communication device 110 may be a dual-watch wireless communication device operable to dynamically select a gateway to extend a communication range of the wireless communication device. First wireless communication device 110 may monitor, using second receiver 240, transmissions from at least second wireless communication device 120, and identify that second wireless communication device 120 can act as a gateway for relaying communications between first wireless communication device 110 and the radio communication system 100. First wireless communication device 110 may transmit a request that second wireless communication device 120 act as a gateway for first wireless communication device 110, and receive, by second receiver 240, an acknowledgement from second wireless communication device 120 that second wireless communication device 120 can act as a gateway for first wireless communication device 110. First wireless communication device 110 can then initiate a connection between first wireless communication device 110 and the radio communication system via second wireless communication device 120, wherein the connection uses a first receiver and the transmitter of first wireless communication device 110.

In some embodiments, first wireless communication device 110 may frequently change the primary and secondary gateways that it has selected for possible gateway operation. When involved in a connection through, for example, second wireless communication device 120, first wireless communication device 110 may quickly decide that the third wireless communication device 130 does not offer as good a signal as the fourth wireless communication device 140, and may wish to add fourth wireless communication device 140 as its designated secondary gateway choice. In either situation, a hysteresis rule may prevent too frequent switching. The hysteresis may be a rule that the signal from the fourth wireless communication device 140 must be better than that from the third wireless communication device 130 by a predetermined margin or for a predetermined period of time, before switching is allowed.

Figure 8:
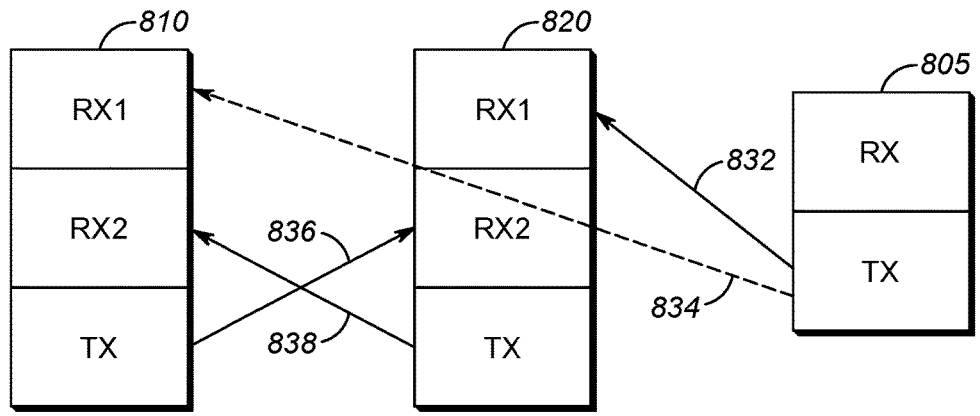
FIG. 8 is a block diagram illustrating signal routing during gateway selection in accordance with some embodiments.

FIG. 8 is a block diagram illustrating signal routing during gateway selection in accordance with some embodiments.

First wireless communication device 810 of FIG. 8 is either out of range or close to the edge of the coverage area of base station 805. Second wireless communication device 820 listens to the control or voice channel of base station 805, as shown by signal path 832. First wireless communication device 810 may also be able to listen to the control or voice channel of base station 805, as shown by dashed signal path 834.

When first wireless communication device 810 detects a coverage issue, or that a coverage issue is likely to occur, first wireless communication device 810 sends a request from its transmitter to the second receiver of second wireless communication device 820. See signal path 836. The request is to establish a gateway via second wireless communication device 820.

Second wireless communication device 820 may then determine that it is in a call with BS805 or in a direct mode call, so cannot act as a gateway. Alternatively, second wireless communication device 820 may determine that it is not in a call with BS805 or in a direct mode call, so can act as a gateway, and therefore can send an acknowledgment to first wireless communication device 810. Signal path 838 shows the acknowledgment transmitted from the transmitter of second wireless communication device 820 to the second receiver of first wireless communication device 810. At this point, second wireless communication device 820 is ready to serve as a gateway for first wireless communication device 810, either immediately or when required.

First wireless communication device 810 and second wireless communication device 820 are each equipped with one transmitter (TX) and a first receiver (RX1) and a second receiver (RX2). Each of first wireless communication device 810 and second wireless communication device 820 may also be equipped with a second transmitter, corresponding to transmitter 250 in FIG. 2

Figure 9:
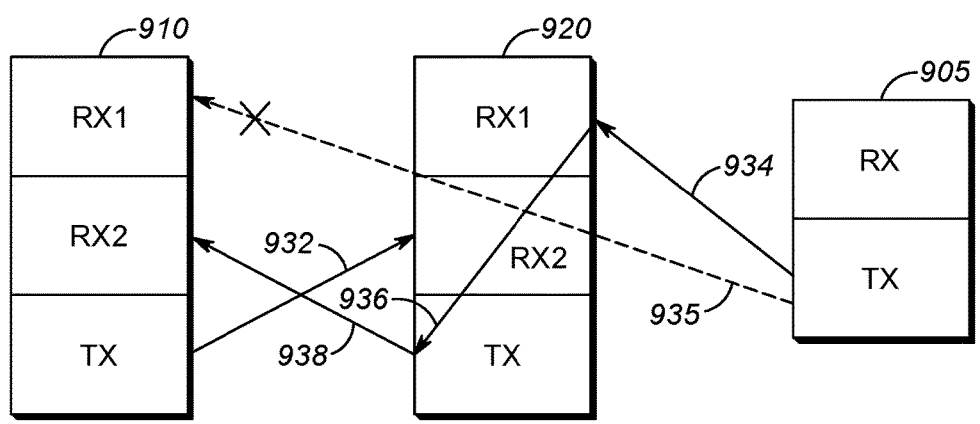
FIG. 9 is a block diagram illustrating signal routing during gateway start-up in accordance with some embodiments.

FIG. 9 is a block diagram illustrating signal routing during gateway start-up in accordance with some embodiments.

First wireless communication device 910 initiates a connection via second wireless communication device 920. Signal path 935 with a cross through it indicates that signals are not reaching first wireless communication device 910 directly from base station 905 at this time point.

First wireless communication device 910 initiates the connection by sending the request indicated by signal path 932, from the transmitter of first wireless communication device 910 to the second receiver of second wireless communication device 920. First wireless communication device 910 had previously selected second wireless communication device 920 to serve as a gateway, using the method shown in FIG. 8, for example. The request from first wireless communication device 910 to second wireless communication device 920 is that second wireless communication device 920 start propagating signals 934 that the first receiver of second wireless communication device 920 receives from base station 905.

As shown by signals 936 and 938, second wireless communication device 920 then propagates signal 934 to first wireless communication device 910. The transmission is from the transmitter of second wireless communication device 920 to the second receiver of first wireless communication device 910, as shown by signal path 938.

Figure 10:
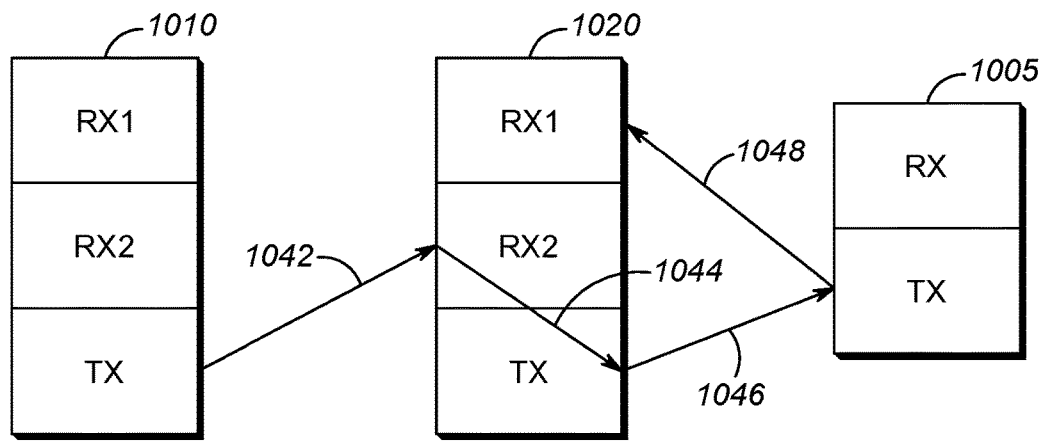
FIG. 10 is a block diagram illustrating signal routing during an ongoing connection in accordance with some embodiments.

FIG. 10 is a block diagram illustrating signal routing during an ongoing connection in accordance with some embodiments. FIG. 10 is a further development of the situation shown in FIG. 9.

In FIG. 9, second wireless communication device 920 had started propagating signal 934 to first wireless communication device 910. When first wireless communication device 1010 starts its own transmissions, see signal path 1042 in FIG. 10, second wireless communication device 1020 propagates signals 1042 to base station 1005. See signal paths 1044 and 1046. Base station 1005 processes the signal from first wireless communication device 1010 as if it had been received directly from first wireless communication device 1010, if the operation is conventional mode. However, if the operation is trunking mode, then second wireless communication device 1020 will have asked for a channel on behalf of first wireless communication device 1010. Signal path 1048 indicates return signaling from base station 1005 to second wireless communication device 1020, which may relate to a call or data of the connection, or may relate to the assignment of the channel in trunked mode, amongst other possibilities.

Figure 11:
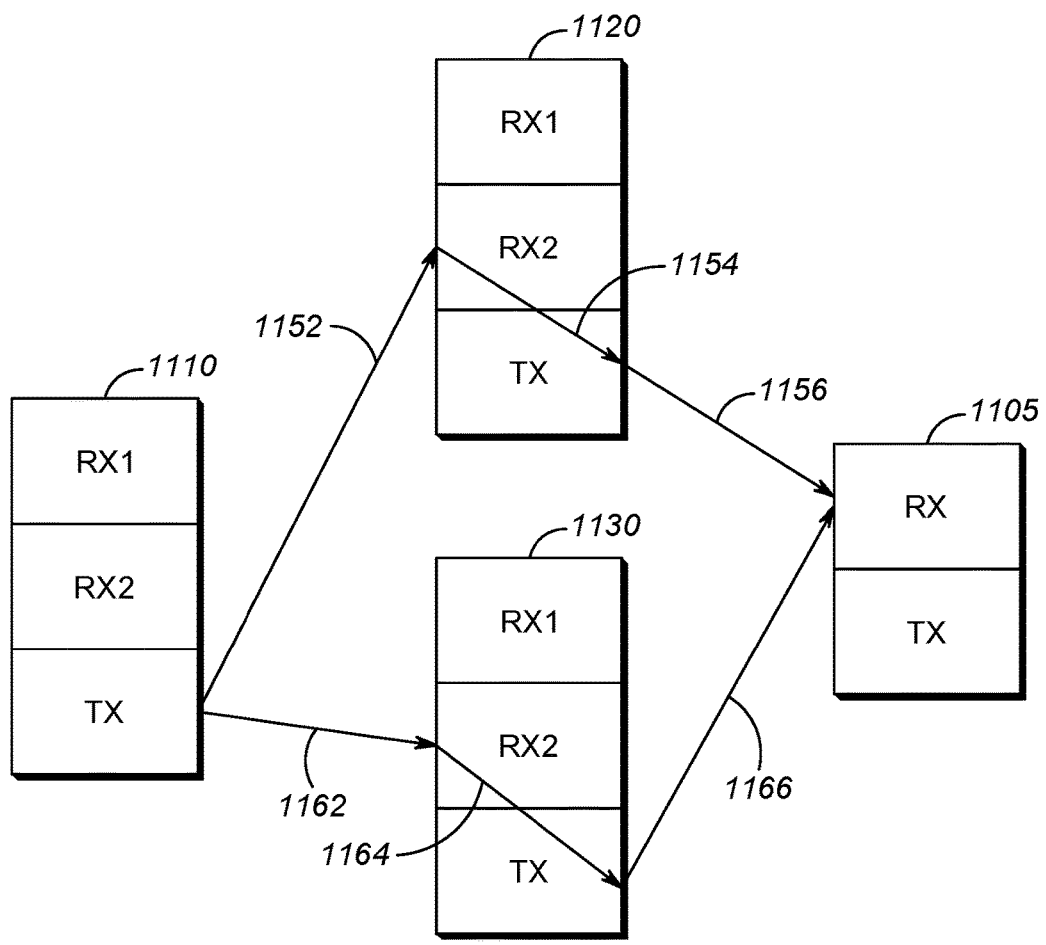
FIG. 11 is a block diagram illustrating signal routing when a wireless communication device selects a replacement gateway, in accordance with some embodiments.

FIG. 11 is a block diagram illustrating signal routing when a wireless communication device selects a replacement gateway in accordance with some embodiments.

First wireless communication device 1110 may need to change gateways. A reason for such a change might be, for example, that first wireless communication device 1110 is changing its location. Alternatively, second wireless communication device 1120 may not be able to operate as gateway, for instance when a connection was started by a user of second wireless communication device 1120, or second wireless communication device 1120 was switched off or is otherwise about to power down.

When first wireless communication device 1110 needs to change gateway, first wireless communication device 1110 starts using third wireless communication device 1130 as a gateway, using the approach outlined in connection with FIG. 9. Whilst second wireless communication device 1120 is still serving as a gateway, signal path 1152, 1154, 1156 indicates the connection passing from first wireless communication device 1110 via second wireless communication device 1120 to base station 1105. For a next successive data unit of the connection, when third wireless communication device 1130 first starts acting as a gateway, the signal path 1162, 1164, 1166 indicates the connection passing from first wireless communication device 1110 via third wireless communication device 1130 to base station 1105.

When changing gateway from second wireless communication device 1120 to third wireless communication device 1130 as a gateway, first wireless communication device 1110 may use signaling as explained in connection with FIG. 7, in order to avoid audio holes.

Figure 12:
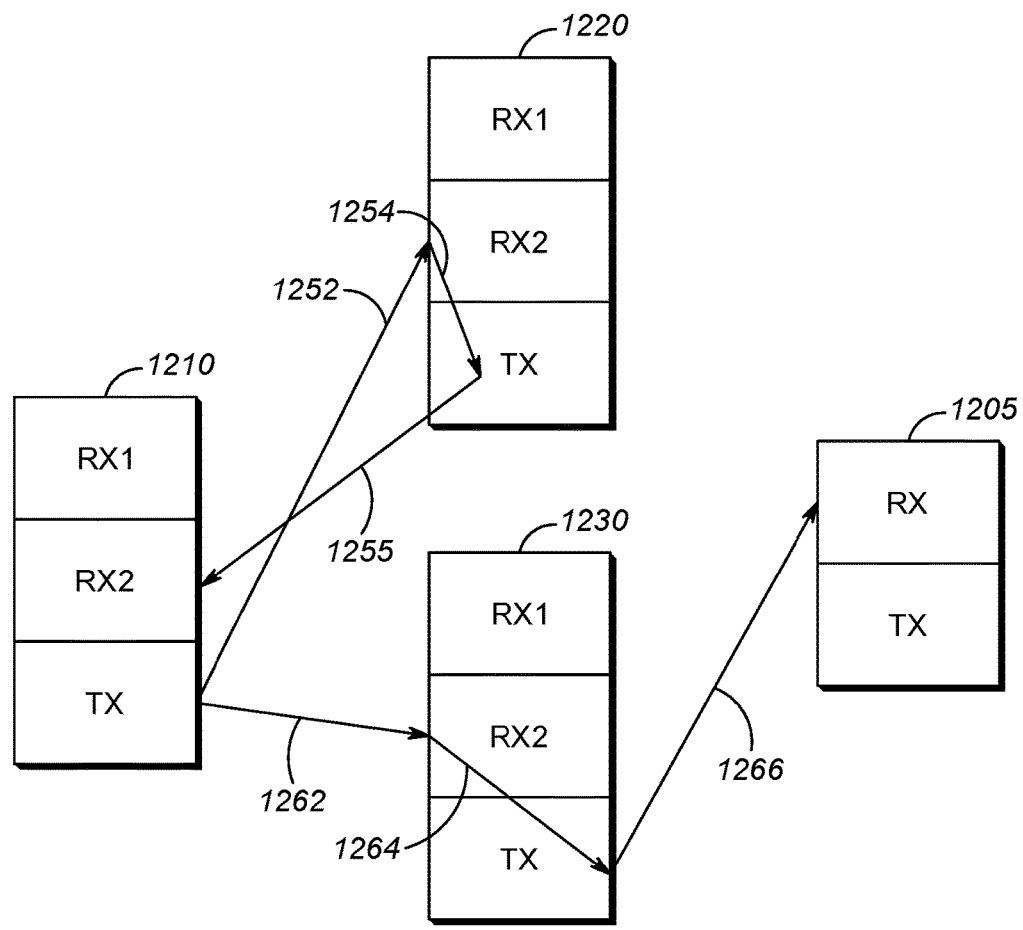
FIG. 12 is a block diagram illustrating signal routing when a gateway ceases supporting a connection in accordance with some embodiments.

FIG. 12 is a block diagram illustrating signal routing when a gateway ceases supporting a connection in accordance with some embodiments.

The process shown in FIG. 12 illustrates signaling when second wireless communication device 1220 indicates that it cannot serve any longer as a gateway. Signal path 1252 indicates the connection from first wireless communication device 1210 to second wireless communication device 1220. Signaling paths 1252 and 1254 indicate second wireless communication device 1220 notifying first wireless communication device 1210 that second wireless communication device 1220 is no longer able to act as a gateway. Signaling paths 1262, 1264 and 1266 indicate subsequent communication from first wireless communication device 1210 to base station 1205, via third wireless communication device 1220.

When changing gateway from second wireless communication device 1220 to third wireless communication device 1230 as a gateway, signaling as explained in connection with FIG. 7 may be employed, in order to avoid audio holes.

The methods and apparatus thus described provide dynamic selection of a gateway/relay. Self organizing full-duplex dual-watch subscriber units may dynamically select an available gateway subscriber unit, when a coverage issue occurs or is likely to occur. The chosen gateway, and/or other potential gateways, may be constantly monitored. Constant monitoring of the connection to gateways can occur on the second receiver. Switching to new gateway can allow a subscriber unit to keep a constant connection to a larger radio communication network. Any subscriber unit that realizes that it can no longer act as a gateway and relay signals, can inform the user of the subscriber that wishes to use it as a gateway that a new gateway will need to be found/used. These actions can occur in the background, without intervention by a user. When a backup gateway has been selected, handoff can be achieved with minimum risk of audio holes. The switching of gateways is performed in a synchronized way, whereby a subscriber unit that is out-of-range synchronizes and directs transmission from both gateways to avoid audio holes/lack of communication to the large radio communication network.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of monitoring for and dynamically selecting a gateway to extend the communication range of a mobile or portable wireless communication device, the mobile or portable wireless communication device comprising at least two receivers and a transmitter for communicating with a base station and/or with other mobile or portable wireless communication devices of a radio communication system, the method comprising:

at a first mobile or portable wireless communication device:
while still within communication range, via the transmitter and a first receiver of the first wireless communication device, of the base station of the radio communication system:
monitoring, by a second receiver of the first mobile or portable wireless communication device listening to a transmitting frequency of portable second wireless communication devices, transmissions from the second wireless communication devices of the radio communication system; and
identifying and ranking, by the first mobile or portable wireless communication device on a basis of signals received in the transmissions from the second wireless communication devices via the monitoring, second wireless communication devices that can act as a gateway for relaying communications between the first mobile or portable wireless communication device and the radio communication system when the first wireless communication device loses connectivity with the base station of the radio communication system;
responsive to a detected loss of connectivity, by the first wireless communication device, with the base station of the radio communication system, to a detected deteriorated connectivity, by the first wireless communication device, with the base station of the radio communication system, or the first wireless communication device detecting that it is moving out of coverage of the base station of the radio communication system based on location data:
transmitting, by the first wireless communication device via the transmitter, a request to a highest ranked particular one of the second wireless communication devices, to request that the particular second mobile or portable wireless communication device act as a gateway for the first mobile or portable wireless communication device to the radio communication system;
receiving, at the first wireless communication device, an acknowledgement from the particular second wireless communication device that the second wireless communication device can act as a gateway for the first mobile or portable wireless communication device; and initiating, by the first mobile or portable wireless communication device, a connection between the first mobile or portable wireless communication device and the radio communication system via the particular second wireless communication device, using the first receiver and the transmitter of the first mobile or portable wireless communication device.

2. The method of claim 1, wherein:

the first mobile or portable wireless communication device is a dual watch subscriber unit having at least two transceivers, wherein a first transceiver comprises the first receiver and the transmitter, and a second transceiver comprises the second receiver and a second transmitter;

the radio communication system is a dispatch radio communication system; and the first mobile or portable wireless communication device configured to operate in trunked or direct mode, using the first transceiver;

the method further comprising:

the second receiver of the first wireless communication device monitoring the transmitting frequency of the second wireless communication devices, whereby the first mobile or portable wireless communication device dynamically maintains up-to-date information on:

signal quality metrics available from the second wireless communication devices; and/or locations of the second wireless communication devices.

3. The method of claim 1, wherein:

the first wireless communication device ranks the second wireless communication devices and selects the particular second wireless communication device based on either:

monitoring recent signal levels and/or signal quality parameters received by the first mobile or portable wireless communication device from second wireless communication devices; or monitoring recent distance information for separations between the first mobile or portable wireless communication device and the second wireless communication devices.

4. The method of claim 1, wherein:

when the first mobile or portable wireless communication device does not receive an acknowledgement from the particular second wireless communication device within a predetermined time period, the first wireless communication device transmits another request to a lower ranked second wireless communication device that the second wireless communication device act as a gateway for the first wireless communication device.

5. The method of claim 1, wherein:

each second wireless communication device receives the request from the first mobile or portable wireless communication device on a second receiver of the respective second mobile or portable wireless communication device.

6. The method of claim 1, further comprising, after initiating a connection between the first mobile or portable wireless communication device and the radio communication system via the particular second wireless communication device:

a user of the particular second mobile or portable wireless communication device listening in to, or taking part in, the connection.

7. The method of claim 1, further comprising:

the first mobile or portable wireless communication device initiating the connection via the particular second wireless communication device on a trunked channel, the trunked channel being assigned to the first mobile or portable wireless communication device by the radio communication system in response to a request for a trunked channel from the particular second wireless communication device on behalf of the first mobile or portable wireless communication device.

8. The method of claim 1, wherein monitoring transmissions from at least the second wireless communication device further comprises:

at the first mobile or portable wireless communication device:

monitoring, by the second receiver of the first mobile or portable wireless communication device, transmissions from the second wireless communication devices, on:

a base station control channel receive frequency, when the radio communication system is a trunked system; or a base station conventional channel receive frequency, when the radio communication system is a conventional system.

9. The method of claim 8, wherein ranking the second wireless communication devices further comprises:

the first wireless communications device:

saving received signal strength information (RSSI), bit error rate (BER) and timing information for transmissions received from the second wireless communication devices; and ranking the second wireless communication devices within a predetermined ranking interval, on the basis of the RSSI information.

10. The method of claim 1, further comprising, after receiving an acknowledgement from the particular second wireless communication device that the particular second wireless communication device can act as a gateway for the first mobile or portable wireless communication device:

the first mobile or portable wireless communication device providing a notification to a user of the first mobile or portable wireless communication device that a gateway is available for a connection between the first mobile or portable wireless communication device and the radio communication system.

11. The method of claim 1, further comprising, when a user of the particular second wireless communication device either initiates a second connection involving the particular second wireless communication device, moves out of range of the first wireless communication device, moves out of range of the radio system, or switches off the particular second wireless communication device:

the particular second wireless communication device sending a notification to the first mobile or portable wireless communication device that the particular second wireless communication device will cease supporting the connection; and the first mobile or portable wireless communication device sending a request to a lower ranked second wireless communication device to take over the connection.

12. The method of claim 11, further comprising:
the particular second wireless communication device completing transmission of a current Logical Data Unit (LDU) of the connection;
the notification from the particular second wireless communication device comprising a message that the particular second wireless communication device will cease supporting the connection starting from a next Logical Data Unit (LDU) of the connection; and
the request from the first mobile or portable wireless communication device to the lower ranked second wireless communication device comprising a request that the lower ranked second wireless communication device take over the connection from the next Logical Data Unit (LDU) of the connection.

13. The method of claim 1, further comprising:
at the first mobile or portable wireless communication device:
periodically receiving messages from the particular second wireless communication device, the messages indicating the continued availability of the particular second wireless communication device to act as a gateway; and
when no message is received from the particular second wireless communication device for a predetermined period:
transmitting a request to a lower ranked second wireless communication device, to request that the lower ranked second wireless communication device act as a gateway for the first wireless communication device; and
receiving an acknowledgement from the lower ranked second wireless communication device that the lower ranked second wireless communication device can act as a gateway for the first mobile or portable wireless communication device.

14. The method of claim 1, further comprising:
at the first mobile or portable wireless communication device:
receiving a message from the particular second wireless communication device, the message indicating that the particular second wireless communication device is no longer available to act as a gateway; and
transmitting a request to a lower ranked second wireless communication device, to request that the lower ranked second wireless communication device act as a gateway for the first mobile or portable wireless communication device; and
receiving an acknowledgement from the lower ranked second wireless communication device that the lower ranked second wireless communication device can act as a gateway for the first wireless communication device.

15. A dual-watch mobile or portable wireless communication device operable to monitor for and dynamically select a gateway to extend a communication range of the mobile or portable wireless communication device, the mobile or portable wireless communication device comprising at least two receivers and a transmitter for communicating with a base station and/or with other wireless communication devices of a dispatch radio communication system, the
mobile or portable wireless communication device operable to:
while still within communication range, via the transmitter and a first receiver of the first wireless communication device, of the base station of the radio communication system:
monitor, by a second receiver of the mobile or portable wireless communication device listening to a transmitting frequency of second wireless communication devices, transmissions from the second wireless communication devices of the radio communication system; and
identify and rank, on a basis of signals received in the transmissions from the second wireless communication devices via the monitoring, the second wireless communication devices that can act as a gateway for relaying communications between the mobile or portable wireless communication device and the radio communication system when the wireless communication device loses connectivity with the base station of the radio communication system;
responsive to a detected loss of connectivity with the base station of the radio communication system, to a detected deteriorated connectivity with the base station of the radio communication system, or to detecting that it is moving out of coverage of the base station of the radio communication system based on location data:
transmit, by the transmitter, a request to a highest ranked particular one of the second wireless communication devices to act as a gateway for the mobile or portable wireless communication device to the radio communication system;
receive, by the second receiver, an acknowledgement from the particular second wireless communication device that the particular second wireless communication device can act as a gateway for the mobile or portable wireless communication device; and
initiate a connection with the radio communication system via the particular second wireless communication device, using the first receiver and the transmitter.

* * * * *